United States Patent

Arai

Patent Number: 5,546,195
Date of Patent: Aug. 13, 1996

[54] APPARATUS FOR REPRODUCING COLOR IMAGES

[75] Inventor: Yoshifumi Arai, Tokyo, Japan

[73] Assignee: Toyo Ink Manufacturing Co., Ltd., Tokyo, Japan

[21] Appl. No.: 289,085

[22] Filed: Aug. 11, 1994

[51] Int. Cl.⁶ .............. H04N 1/46; H04N 1/56; H04N 1/60
[52] U.S. Cl. .......... 358/518; 358/519; 358/520; 358/523
[58] Field of Search ............ 358/518, 519, 358/520, 523; 382/167, 156

[56] References Cited

U.S. PATENT DOCUMENTS

| | | | |
|---|---|---|---|
| 5,146,328 | 9/1992 | Yamasaki et al. | 358/519 |
| 5,200,816 | 4/1993 | Rose | 358/518 |
| 5,386,496 | 1/1995 | Arai et al. | 358/518 |

FOREIGN PATENT DOCUMENTS

| | | | |
|---|---|---|---|
| 237371 | 8/1994 | Japan | H04N 1/46 |
| 237370 | 8/1994 | Japan | H04N 1/46 |

Primary Examiner—Scott A. Rogers
Attorney, Agent, or Firm—Ladas & Parry

[57] ABSTRACT

In a reproduced color correction system, a photometer measures external illuminant light and sends a measured result to a workstation. The workstation determines the type of an illuminant on the basis of the measured result and sends a selection signal and corresponding colorimetric value data to a neural network management unit. The neural network management unit is provided with a plurality of neural networks associated with types of illuminants. The neural network selected according to the selection signal converts the colorimetric value to a color separation value according to a post-learning transformation function. A color printing device outputs a color image on the basis of the generated color separation value. Thus, the neural network associated with the illuminant used for observation reference is selected, and appropriate color transformation is performed. Accordingly, even if the viewing condition is changed, color matching can be performed so that observed reproduced colors are unchanged.

14 Claims, 9 Drawing Sheets

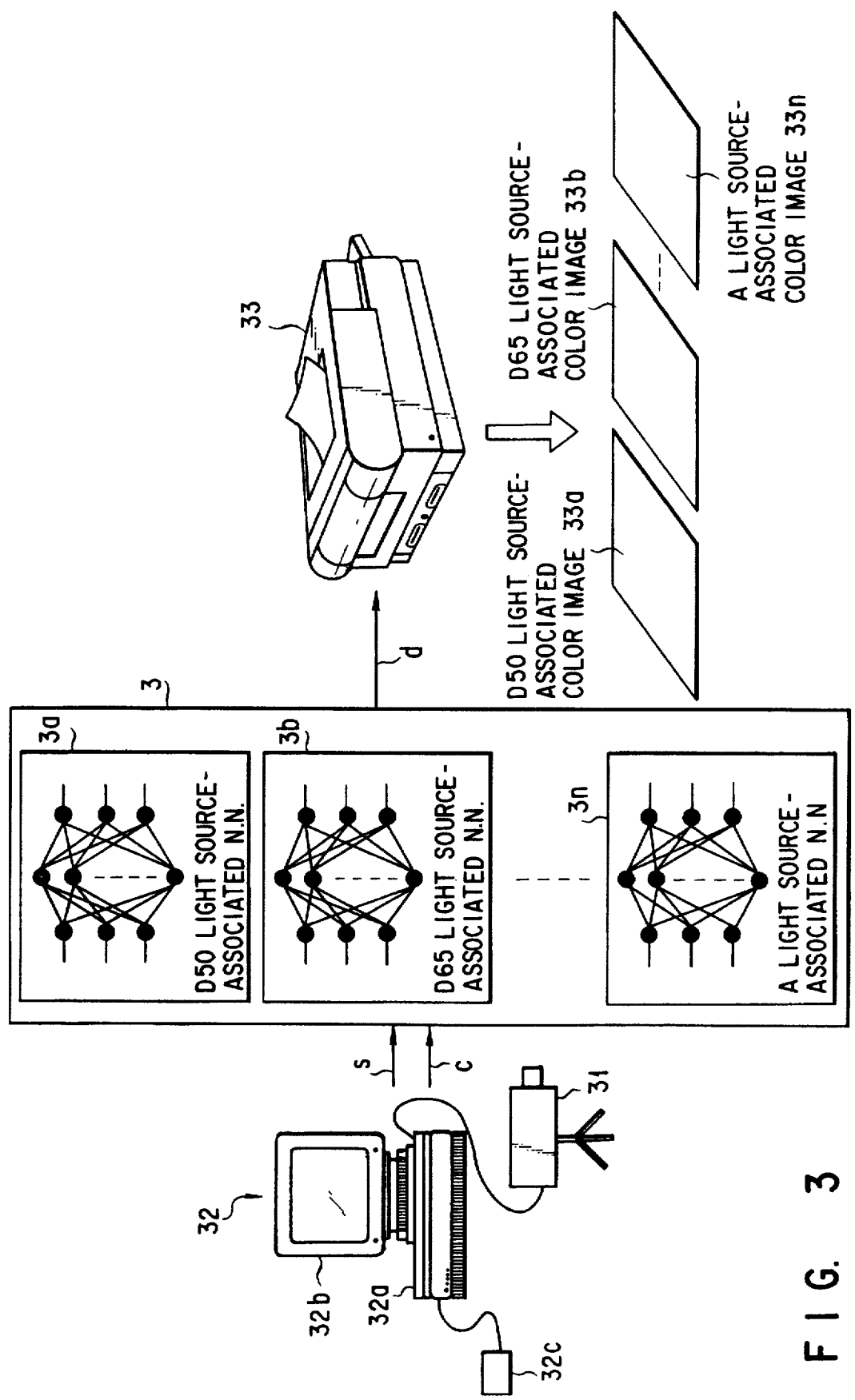
F I G. 3

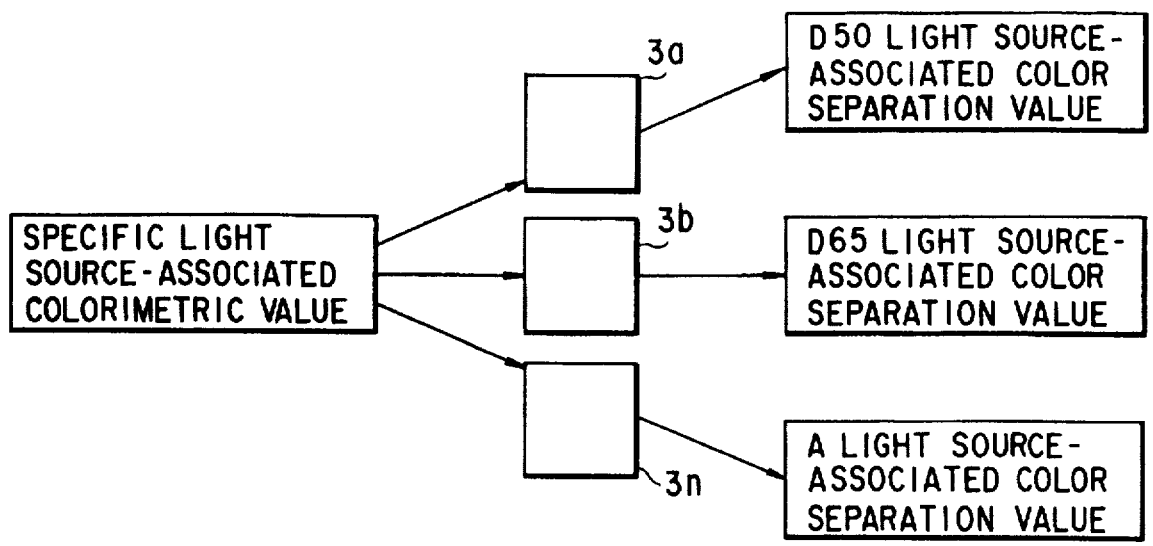
F I G. 4
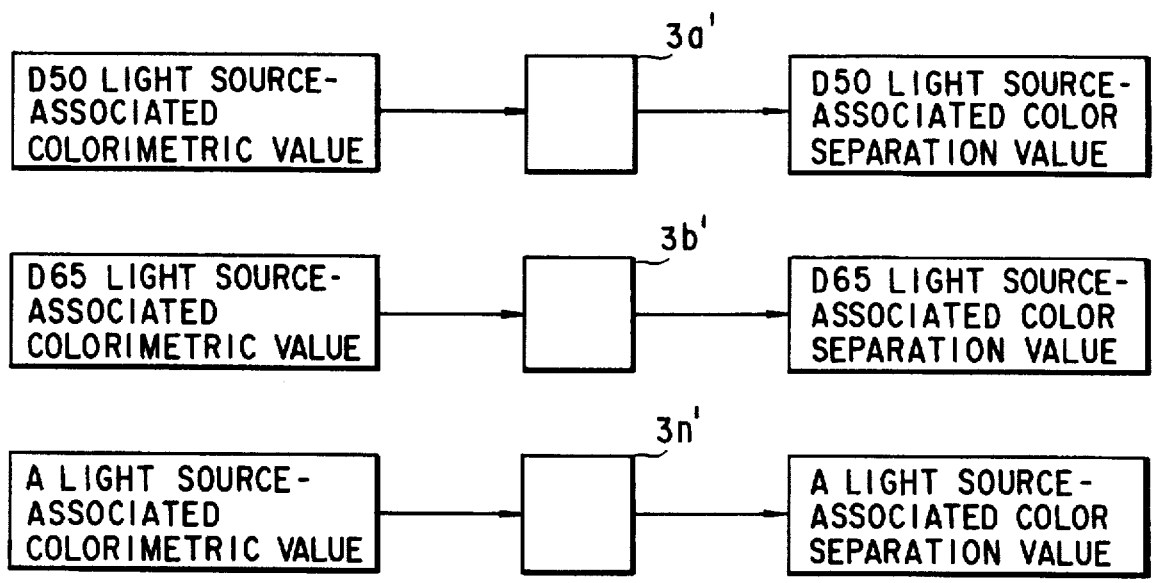
F I G. 5

5,546,195

1

APPARATUS FOR REPRODUCING COLOR IMAGES

BACKGROUND OF THE INVENTION

1. Field of the Invention

The present invention relates generally to a reproduced color correction system for correcting a reproduced color of a printed matter, and more particularly to a reproduced color correction system for correcting a reproduced color of a printed matter so that a perceptual color of the printed matter may be the same even under illuminant with different color temperatures or non-standard illuminant.

2. Description of the Related Art

In the prior art, there has been a technical object to exactly reproduce a color of a printed matter under a single standard illuminant such as D50 or D65. In other words, conventionally, color evaluation or color matching of a printed matter is performed under a single standard illuminant.

On the other hand, a color of a printed matter observed under a specific standard illuminant is observed as a different color under non-standard illuminant or other standard illuminant. In the prior art, however, it has not been required so much to evaluate a color under an illuminant different from a specific light source. Thus, there has been no technical object to perform color matching so that a color of a printed matter may be the same even if a reference standard illuminant for observation is changed. At present, few techniques have been developed to correct a color of a printed matter so that the color may be observed as the same even under various standard illuminants, and not under a single standard illuminant.

With recent development of simplified color printing machines such as a color printer in color desk top publishing (DTP) color printed matters have been used for various purposes. Specifically, it has been required that color printed matters be observed under various viewing condition. At the same time, it has been required that a reproduced color be corrected when viewing condition are changed, so that a perceptual color of a printed matter may be the same.

At present, it is necessary not only to perform color matching under specific illuminant, but also to correct a color of a printed matter when the specific illuminant is optionally changed, so that it may be observed as the same as before the change of the illuminant.

In an example of a conventional color transformation technique for color matching, a neural network has been utilized. By making use of the neural network, a desired color is reproduced with high accuracy under a specific illuminant. For example, even when colors are reproduced by color printers with different chemical characteristic of the colorant or mechanical characteristic of the pinter, matters of the same colors can be obtained. A procedure of using the neural network in this case will be described below. By way of example, a multilayered feed-forward type neural network having a learning function is used.

FIG. 1 shows an example of a color transformation technique using the neural network. As is shown in FIG. 1, for example, coordinate values (or colorimetric values) 11 in a uniform color space such as "L*a*b*" or "L*u*v*" are provided. These coordinate values are set with a specific standard illuminant used as a reference illuminant. The "L*a*b*" or "L*u*v*" is a color system specified by the Commission Internationale de l'Eclairage (CIE). Coordinate values 12 are output as electric signals capable of being processed by a computer. On the other hand, the neural network 1 has a learning function. By using the learning function, desired color transformation can be realized. The neural network 1 is prepared for a specific standard illuminant, and the training of the neural network is performed with respect to the specific illuminant. The coordinate values 11 are converted to the coordinate values 12 of "RGB", "CMY", "CMYK", etc. by the neural network 1.

At the time of learning, some samples colors, of which pre-transformation coordinate values 11 and corresponding coordinate values 12 are known in advance, are used. At first, pre-transformation coordinate values, the post-transformation coordinate values of which are already known, are given to an input layer 1a of the neural network. Subsequently, the post-transformation coordinate values are given to an output layer 1c of the neural network as teacher signals. On the basis of these given coordinate values, the learning is performed for some sample colors. After completion of the learning, the connection weight among neurons is determined. Thus, the coordinate values 11 are converted to the coordinate values 12 by the neural network which has completed the learning. Based on the coordinate values 12, a desired reproduced color is obtained.

As has been described above, by using the neural network, a more exact reproduced color can be obtained under a specific standard illuminant.

Another example of the color transformation technique is a look-up table method. As is shown in FIG. 2, a three-dimensional input/output space is provided. Each of the three axes defining the input/output space is equally divided into several regions. Specifically, four regions are made as shown in FIG. 2. Thus, in the input/output space, 5×5×5= 125 lattice points are defined. A three-dimensional LUT for defining the correspondency between an input color and an output color at each lattice point is prepared. If an input color to be converted corresponds to a lattice point, an output color is derived according to the definitions on the table. If there is no lattice point corresponding to the input color to be converted, an interpolation value P in a space defined by input data items A to H of eight points arranged discretely to surround the position of the input color is obtained. Based on the obtained interpolation value, an output color is obtained. The color transformation technique using the look-up table method is disclosed in, e.g. U.S. Pat. No. 4,275,413. A prism interpolation method, which will be described later, is an interpolation method used in the look-up table method accompanied with an interpolation.

As has been described above, color evaluation or color matching of a printed matter is normally performed under specific illuminant. In this case, by making use of the neural network or look-up table method, color transformation for color matching can be performed exactly. On the other hand, at present, there is a demand that exact color matching be performed so that the color of a printed matter may be the same even if observation light is changed. However, a correction technique for such color matching has not yet been developed.

SUMMARY OF THE INVENTION

The object of the present invention is to provide a reproduced color correction system for correcting a perceptual color of a printed matter so that the color of the printed matter may be the same even under illuminants of different color temperatures.

According to a first aspect of the invention, there is provided an apparatus for converting X,Y,Z; L*a*b*; or L*u*v colorimetric values of a color image to R,G,B; C,M,Y; or C,M,Y,K, color separation values, the apparatus comprising: a plurality of converting means for converting the colorimetric values of the colored original which is obtained under a specific illuminant to the color separation values under a plurality of observation illuminants; means for selecting one of the plurality of transformation means; and means for outputting the color image based on the color separation value obtained by the converting means selected by the selecting means.

According to a second aspect of the invention, there is provided an apparatus for converting X,Y,Z; L*a*b*; or L*u*v* colorimetric values of a color image to R,G,B; C,M,Y; or C,M,Y,K, color separation values, the apparatus comprising: a plurality of converting means for converting the colorimetric values of the colored original which is obtained under a plurality of illuminants to the color separation values under a plurality of observation illuminants; means for selecting one of the plurality of transformation means; and means for outputting the color image based on the color separation value obtained by the converting means selected by the selecting means.

According to a third aspect of the invention, there is provided an apparatus for converting X,Y,Z; L,a,b*; or L*u*v* colorimetric values of a color image to R,G,B; C,M,Y; or C,M,Y,K, color separation values, the apparatus comprising: a neural network for converting the colorimetric values to the color separation values, the neural network having neurons connected to each other via given weights; means for storing plural sets of weights which make the neural network convert the colorimetric values of the color image which is obtained under a specific illuminant to plural color separation values under plural observation illuminants; means for selectively supplying one of the sets of weights stored in the storing means to the neural network in accordance with an observation illuminant; and means for outputting the color image based on the color separation value obtained by the neural network supplied with the set of weights selected by the selecting means.

The transformation means having the above structure may comprise a multilayered feed-forward type neural network, or look-up table for obtaining interpolation values. The illuminant to be selected may be one of sources consisting of a D illuminant with color temperatures of 4000 to 20000[K], fluorescent lamp illuminants of standards F1 to F12, an A illuminant, a B illuminant, and a C illuminant.

There are two processes for selecting the transformation means: a manual selection process by an operator, and an automatic selection process based on a measured result of external illuminant light by use of a photometer.

According to the reproduced color correction system of the present invention with the above structure, even if the viewing condition is changed, the reproduced color can be corrected so that the observed reproduced color on the printed matter is always the same. Accordingly, even if the reproduced color is observed under an illuminant other than the standard illuminant, color matching can be performed easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows a structure of a reproduced color correction system according to first and second embodiments of the present invention;

FIG. 4 illustrates a first relationship between a colorimetric value and a color separation value;

FIG. 5 illustrates a second relationship between a colorimetric value and a color separation value;

DETAILED DESCRIPTION OF THE PREFERRED EMBODIMENTS

Figure 1:
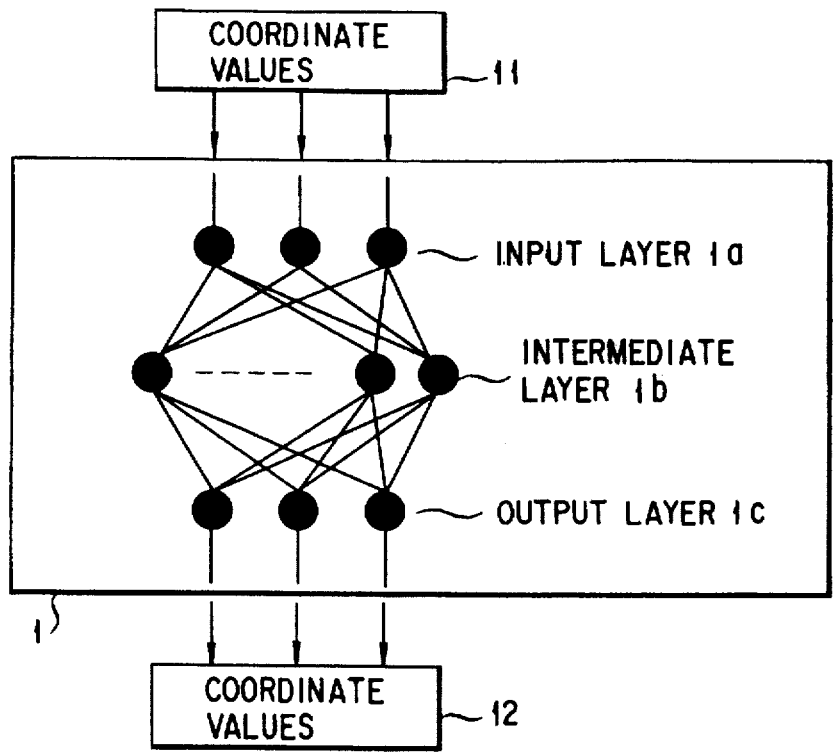
FIG. 1 is a conceptual diagram illustrating a color transformation technique using a conventional neural network.
Figure 2:
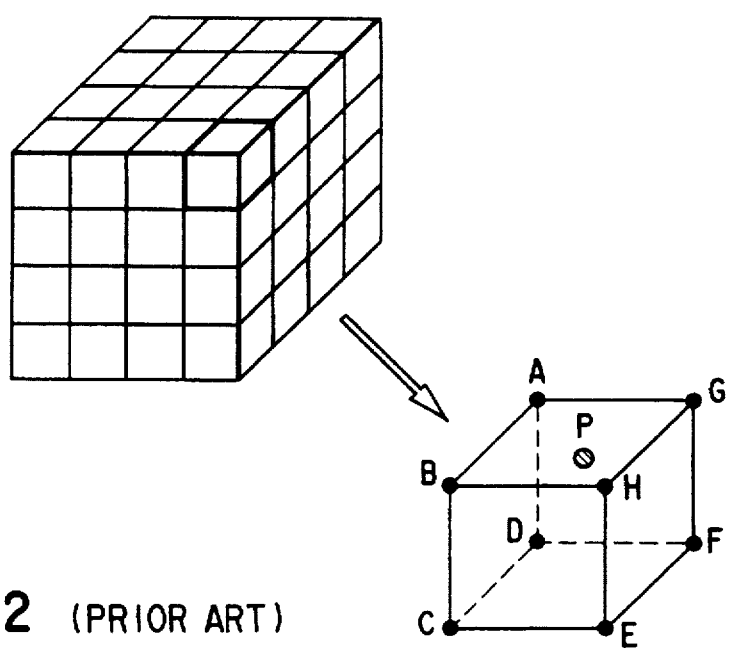
FIG. 2 is a perspective view illustrating a sample of a conventional look-up table method accompanied with an interpolation.

Embodiments of the present invention will now be described with reference to the accompanying drawings.

FIG. 3 shows an entire structure of a reproduced color correction apparatus according to first and second embodiments of the present invention. At first, the first embodiment will be described. As is shown in FIG. 3, the reproduced color correction apparatus includes an external photometer 31. The external photometer 31 receives external illuminant light and measures a color temperature or a spectral distribution of the illuminant light. The illuminant light received by the photometer 31 is a reference illuminant light employed when a printed matter to be output is observed. The external photometer 31 sends a signal representing the spectral distribution of the measured illuminant to a workstation 32.

The workstation 32 comprises a body 32a and a display 32b for displaying various information. The body 32a is connected to an input device 32c manipulated by an operator (user). The body 32a receives a signal from the external photometer 31 and determines which type of standard illuminant corresponds to the illuminant received by the external photometer 31. More specifically, the body 32a has a table, etc. which stores a spectral distribution of each of a plurality of types of illuminants, and a determination unit (not shown) for determining the illuminant corresponding to the received illuminant with respect to these spectral distributions. Accordingly, the determination unit receives a signal from the external photometer 31 and determines the type of the associated illuminant by reference to the table, etc. The types of illuminants prepared are, e.g. a D illuminant with a color temperature of 4000 to 20000 (K), fluorescent lamp illuminants of F1 to F12, an A illuminant, a B illuminant, a C illuminant, etc. In the present embodiment, as shown in FIG. 3, there are provided a plurality of types of standard illuminants such as a D50 illuminant, a D65 illuminant, an A illuminant, etc. which are needed for the user's observation.

The above description is directed to the case where the associated standard illuminant is determined automatically on the basis of the signal from the external photometer 31. In this case, the external photometer 31 is required to determine the type of the standard illuminant. On the other hand, if the user understands the type of the standard illuminant employed as a reference illuminant for observation, the user (or operator) sends a command signal to the body 32a by means of the input device 32c, thereby manually designating the type of the associated standard illuminant. In this case, the external photometer 31 is not required. Accordingly, there are two processes for determining the standard illuminant. After determining the type of the standard illuminant, the station body 32a sends a selection signal "s" representing the determined type of standard illuminant to a neural network management unit 3.

The body 32a includes a storage unit (not shown) for storing image information needed for printing. The stored image information contains colorimetric value data. The colorimetric value data is preset with a specific standard illuminant used as a reference source (e.g. the D50 illuminant used as a reference source). In this case, the colorimetric value means a coordinate value in a uniform color space such as "CIE XYZ" "CIE L*a*b*" or "CIE L*u*v*". The colorimetric value data is taken out from the storage unit and delivered to the neural network management unit 3 as a colorimetric value signal "c".

The neural network management unit 3 comprises feedforward type neural networks 3a, 3b, 3n, etc. associated with the D50 illuminant, D65 illuminant, A illuminant, etc. Each neural network itself is the same as is used in the above-described conventional color transformation technique. Each neural network inputs a colorimetric value under a specific illuminant, converts the colorimetric value to a color separation value for the associated illuminant, and outputs the converted value. In this case, the color separation value means a value of RGB (red-green-blue), CMY (cyan-magenta-yellow), CMYK (cyan-magenta-yellow-black), etc. of, e.g. a color printing device, and this value depends on the color printing device. Each neural network has a learning function. By the learning function, weighting among neurons is determined. In the case of the learning, in each neural network, an input layer is provided with a colorimetric value under a specific illuminant (D50 illuminant), and an output layer is provided with a color separation value corresponding to the colorimetric value under each illuminant.

The neural network management unit 3 receives the selection signal "s" from the workstation 32 and selects an associated neural network. The neural network management unit 3 delivers the colorimetric signal "c" sent from the workstation 32 to the input side of the selected neural network. As a result, if the selection signal "s" indicates that the D50 illuminant has been selected, the D50 illuminant-associated neural network 3a is used. If the selection signal "s" indicates that the D65 illuminant has been selected, the D65 illuminant-associated neural network 3b is used. Similarly, if the selection signal "s" indicates that the A illuminant has been selected, the A illuminant-associated neural network 3n is used. Each neural network, when selected, has already learnt the transformation procedure for converting the colorimetric value under the specific illuminant (D50 illuminant in this case) to the color separation value corresponding to the colorimetric value under each illuminant.

FIG. 4 illustrates a relationship between the colorimetric value and color separation value in the above case. Specifically, the neural network 3a converts the colorimetric value associated with the specific illuminant (D50 illuminant) to the color separation value associated with the D50 illuminant. Similarly, the neural network 3b converts the colorimetric value associated with the specific illuminant (D50 illuminant) to the color separation value associated with the D65 illuminant, and the neural network 3n converts the colorimetric value associated with the specific illuminant (D50 illuminant) to the color separation value associated with the A illuminant.

Refer again to FIG. 3. For example, when the A illuminant-associated neural network 3n is selected among the provided neural networks, the neural network 3n which has completed the learning operation receives the colorimetric value set with reference to the D50 illuminant and generates the A illuminant-associated color separation value. The neural network management unit 3 sends via a transmitter (not shown) the generated color separation value to a color printing device 33 as a color separation value signal "d".

On the basis of the color separation value signal "d" sent from the neural network management unit 3, the color printing device 33 outputs a color image. In this case, a reproduced color appears on a printed matter. If color transformation is performed by the D50 illuminant-associated neural network 3a, a D50 illuminant-associated color image 33a is output. If color transformation is performed by the D65 illuminant-associated neural network 3b, a D65 illuminant-associated color image 33b is output. Similarly, if color transformation is performed by the A illuminant-associated neural network 3n, an A illuminant-associated color image 33n is output.

It should be noted that the neural network management unit 3 can be housed in the body 32a.

Figure 9:
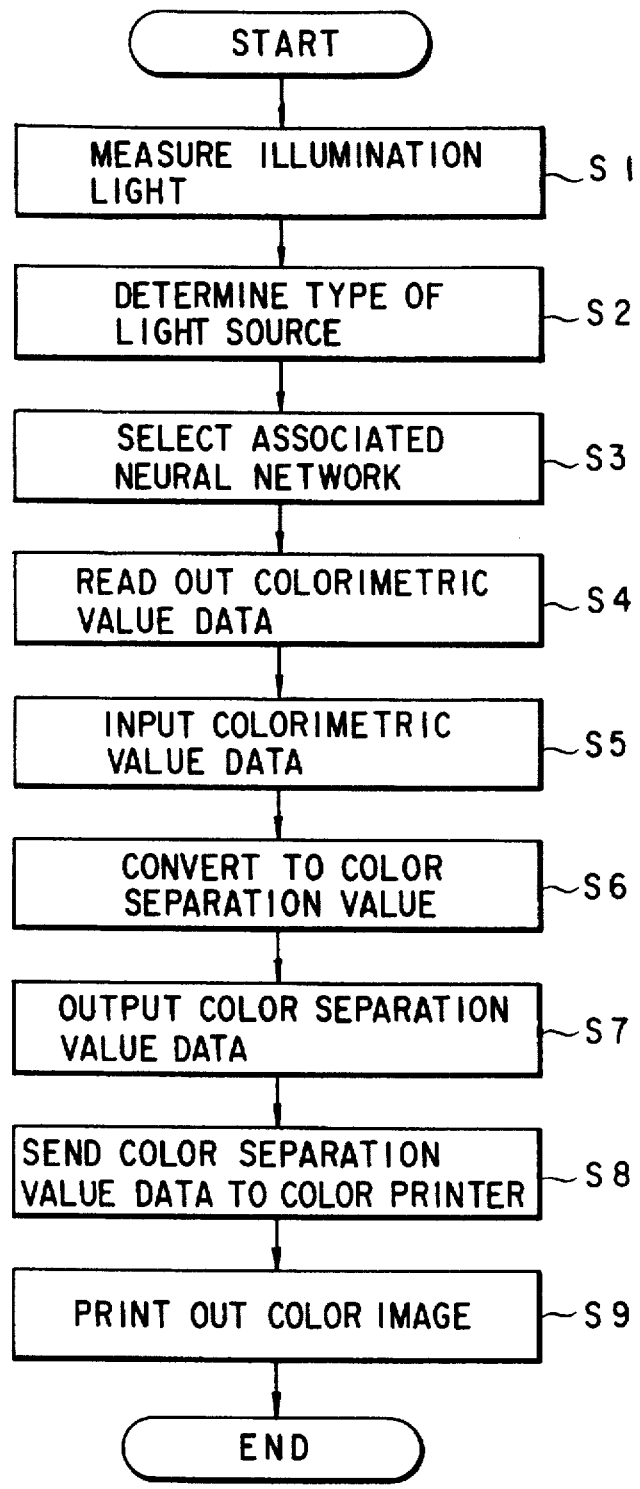
FIG. 9 is a flow chart illustrating an operation of the first and second embodiments.

The operation of the first embodiment will now be described with reference to the flow chart of FIG. 9.

Illuminant light radiated from an external illuminant is taken into the external photometer 31 and measured (step S1). The measured data is sent to the workstation 32 and the type of the external illuminant is determined (step S2). The neural network corresponding to the type of the illuminant is selected (step S3). The transformation function of each neural network has completed a learning process. The colorimetric value data set with reference to the specific illuminant (D50 illuminant) is taken out from the storage unit of the workstation 32 (step S4). The taken-out colorimetric value data is input to the selected neural network (step S5). The colorimetric value is converted to a color separation value by the selected neural network (step S6). The color separation value data is output from the neural network (step S7). The generated color separation value data is transmitted to the color printing device 33 (step S8). The color printing device 33 prints out a color image (step S9). Thus, the reproduced color in the case where the above illuminant is used as a reference source for observation is obtained. In this process the external photometer 31 is used. If the user selects and designates the type of the illuminant manually through the workstation, steps S1 and S2 are omitted since there is no need to determine the type of the illuminant.

As has been described above, in the first embodiment, there are provided neural networks for converting the colorimetric values under the specific illuminant to the color separation values under various illuminants, a suitable one of the neural networks may be selected and desired color transformation can be performed. Accordingly, even if the illuminant for observation reference is changed, the color matching can be effected so that the color of the printed matter at the time of observation may be unchanged.

A second embodiment of the present invention will now be described.

The second embodiment, too, will be described with reference to FIG. 3 which has been referred to in connection with the first embodiment. Like the first embodiment, the reproduced color correction apparatus includes an external photometer 31. The external photometer 31 receives external illuminant light and measures a color temperature of the illuminant light. The illuminant light received by the photometer 31 is a reference illuminant light employed when a printed matter to be output is observed. The external photometer 31 sends a signal representing a spectral distribution of the measured illuminant to a workstation 32.

The workstation 32 comprises a body 32a and a display 32b for displaying various information. The body 32a is connected to an input device 32c manipulated by an operator (user). The body 32a receives a signal from the external photometer 31 and determines which type of standard illuminant corresponds to the illuminant received by the external photometer 31. More specifically, the body 32a has a table, etc. which stores a spectral distribution of each of a plurality of types of standard illuminants, and a determination unit (not shown) for determining the standard illuminant corresponding to the received illuminant with respect to these spectral distributions. Accordingly, the determination unit receives a signal from the external photometer 31 and determines the type of the associated standard illuminant by reference to the table, etc. The types of illuminants prepared are, e.g. a D illuminant with a color temperature of 4000 to 20000 (K), fluorescent lamp illuminants of F1 to F12, an A illuminant, a B illuminant, a C light source, etc. In the present embodiment, as shown in FIG. 3, there are provided a plurality of types of standard illuminants such as a D50 illuminant, a D65 illuminant, an A illuminant, etc. which are needed for the user's observation.

This structure is the same as in the first embodiment. In addition, like the first embodiment, there are two processes for determining the standard illuminant. According to one process, the associated standard illuminant is determined automatically on the basis of the signal from the external photometer 31. According to the other process, the user sends a command signal to the body 32a by means of the input device 32c, thereby manually designating the type of the associated standard illuminant.

After determining the type of the standard illuminant, the station body 32a sends a selection signal "s" representing the determined type of standard illuminant to a neural network management unit 3.

The body 32a includes a storage unit (not shown) for storing image information needed for printing. The stored image information contains colorimetric value data. In this case, the kind of colorimetric value data is different from that in the first embodiment. In the first embodiment the colorimetric value data is preset with reference to the specific standard illuminant (D50 illuminant), whereas in the second embodiment the colorimetric value data consists of several kinds of data items preset with reference to the various illuminants (D50 illuminant, D65 illuminant, A illuminant, etc.). Thus, the storage unit in the body 32a stores these kinds of colorimetric value data items. For example, when the A illuminant is selected, an A illuminant-associated colorimetric value data is taken out from the storage unit and sent to the neural network management unit 3 as a colorimetric value signal "c".

The neural network management unit 3 comprises feedforward type neural networks 3a', 3b', 3n', etc. (reference numerals different from those shown in FIG. 3 are used for distinction from the first embodiment) associated with the D50 illuminant, D65 illuminant, A illuminant, etc. Each neural network itself is the same as is used in the above-described conventional color transformation technique. Neural networks input colorimetric values under mutually different illuminants, convert the colorimetric values to color separation values for the associated illuminants, and output the converted values. Each neural network has a learning function. By the learning function, weighting among neurons is determined. In the case of the learning, in the respective neural network, input layers are provided with colorimetric values under specific illuminants, and output layers are provided with color separation values under the associated illuminants.

The neural network management unit 3 receives the selection signal "s" from the workstation 32 and selects an associated neural network. The neural network management unit 3 delivers the colorimetric signal "c" sent from the workstation 32 to the input side of the selected neural network. As a result, if the selection signal "s" indicates that the D50 illuminant has been selected, the D50 illuminant-associated neural network 3a is used. If the selection signal "s" indicates that the D65 illuminant has been selected, the D65 illuminant-associated neural network 3b is used. Similarly, if the selection signal "s" indicates that the A illuminant has been selected, the A illuminant-associated neural network 3n is used. Each neural network, when selected, has already learnt the transformation procedure for converting the colorimetric value under the individually associated illuminant to the color separation value under the individually associated illuminant.

As is illustrated in FIG. 5, the respective neural networks receive colorimetric values under mutually different illuminants and generate color separation values under these illuminants. Specifically, the neural network 3a' for the D50 illuminant receives the colorimetric value associated with the D50 illuminant and generates the color separation value associated with the D50 illuminant. Similarly, the neural network 3b' for the D65 illuminant receives the colorimetric value associated with the D65 illuminant and generates the color separation value associated with the D65 illuminant, and the neural network 3n' for the A illuminant receives the colorimetric value associated with the A illuminant and generates the color separation value associated with the A illuminant.

Refer again to FIG. 3. For example, when the A illuminant-associated neural network 3n is selected among the provided neural networks, the neural network 3n which has completed the learning operation receives the colorimetric value set with reference to the A illuminant and generates the A illuminant-associated color separation value. The neural network management unit 3 sends via a transmitter (not shown) the generated color separation value to a color printing device 33 as a color separation value signal "d".

On the basis of the color separation value signal "d" sent from the neural network management unit 3, the color printing device 33 outputs a color image. In this case, a reproduced color,appears on a printed matter. If color transformation is performed by the D50 illuminant-associated neural network 3a, a D50 illuminant-associated color image 33a is output. If color transformation is performed by the D65 illuminant-associated neural network 3b, a D65 illuminant-associated color image 33b is output. Similarly, if color transformation is performed by the A illuminant-associated neural network 3n, an A illuminant-associated color image 33n is output.

It should be noted that the neural network management unit 3 can be housed in the body 32a.

The operation of the second embodiment will now be described with reference to the flow chart of FIG. 9.

Illuminant light radiated from an external illuminant is taken into the external photometer 31 and measured (step S1). The measured data is sent to the workstation 32 and the type of the external illuminant is determined (step S2). The neural network corresponding to the type of the illuminant is selected (step S3). The transformation function of each neural network has completed a learning process. The colorimetric value data associated with the type of the illuminant is taken out from the storage unit of the workstation 32 (step S4). The taken-out colorimetric value data is input to the selected neural network (step S5). The colorimetric value is converted to a color separation value by the selected neural network (step S6). The color separation value data is output from the neural network (step S7). The generated color separation value data is transmitted to the color printing device 33 (step S8). The color printing device 33 prints out a color image (step S9). Thus, the reproduced color in the case where the above illuminant is used as a reference source for observation is obtained. In this process the external photometer 31 is used. If the user selects and designates the type of the illuminant manually through the workstation, steps S1 and S2 are omitted since there is no need to determine the type of the illuminant.

As has been described above, in the second embodiment, there are provided neural networks for converting the colorimetric values under the mutually different illuminants to the color separation values under these illuminants, a suitable one of the neural networks may be selected and desired color transformation can be performed. Accordingly, even if the illuminant for observation reference is changed, the color matching can be effected so that the color of the printed matter at the time of observation may be unchanged.

A third embodiment of the present invention will now be described.

Figure 6:
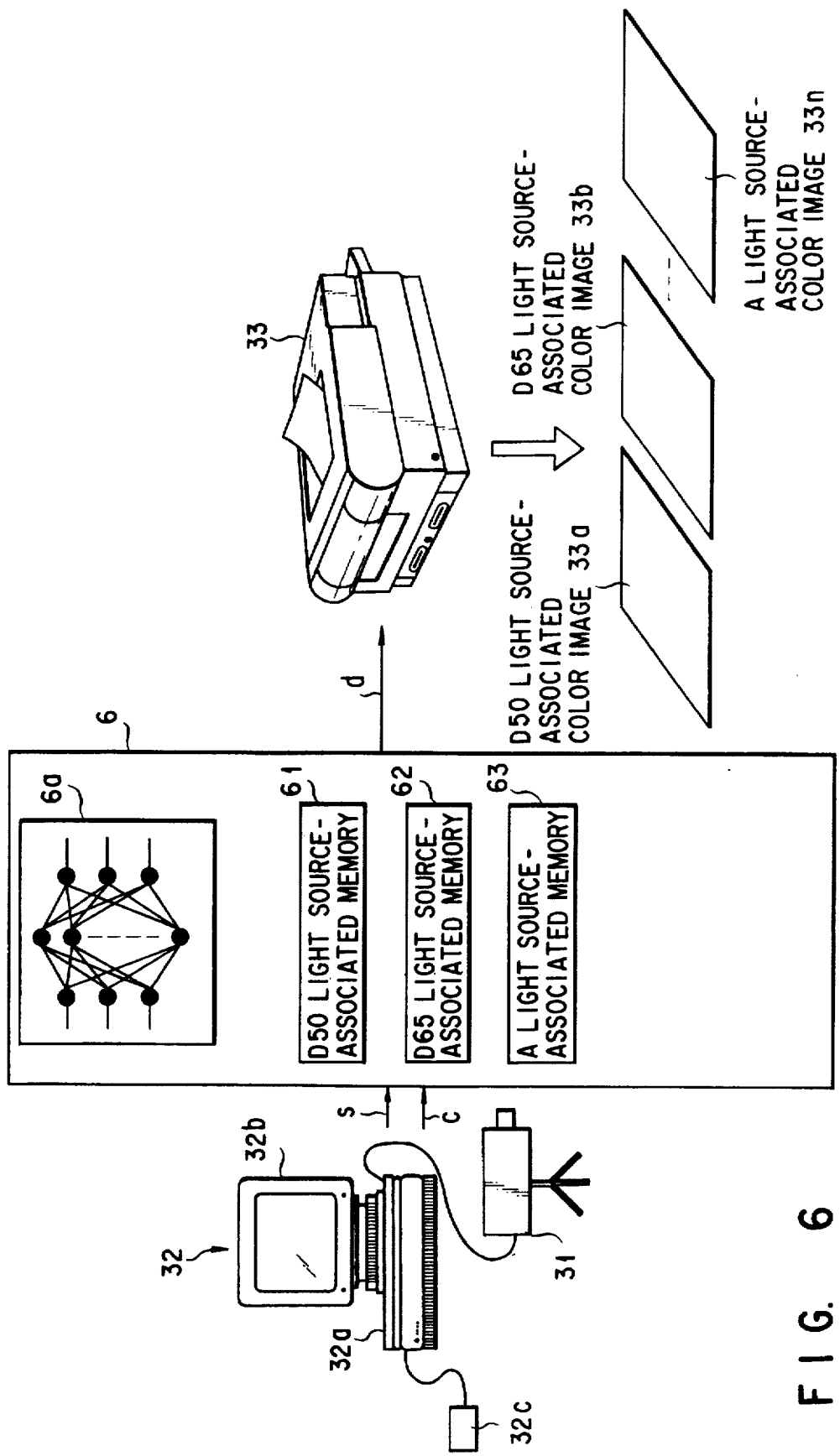
FIG. 6 shows a structure of a reproduced color correction system according to a third embodiment of the present invention.

FIG. 6 shows an entire structure of a reproduced color correction apparatus according to the third embodiment of the invention. In FIG. 6, the structures and functions of the external photometer 31, workstation 32 and input device 32c are the same as those in the first embodiment. After determining the standard illuminant, the body 32a sends to a neural network management unit 6 a selection signal "s" representing the type of the determined standard illuminant. The storage unit in the body 32a stores colorimetric value data set in advance with reference to a specific standard illuminant. The colorimetric value data is taken out from the storage unit and sent to the neural network management unit 6 as a colorimetric value signal "c".

The neural network management unit 6 includes a feed-forward type neural network 6a and also includes memories 61, 62 and 63 for storing weighting coefficients for determining the weighting among neurons in the neural network 6a. The weighting coefficients stored in the memory 61 is used to convert the colorimetric value under a specific illuminant (D50 illuminant in this case) to the color separation value under the D50 illuminant. The weighting coefficients stored in the memory 62 are used to convert the colorimetric value under the specific illuminant (D50 illuminant) to the color separation value under the D65 illuminant. Similarly, the weighting coefficients stored in the memory 63 are used to convert the colorimetric value under a specific illuminant (D50 illuminant in this case) to the color separation value under the A illuminant.

The neural network management unit 6 receives a selection signal "s" from the workstation 32 and selects the associated memory. If the selection signal "s" indicates that the D50 illuminant has been selected, the D50 illuminant-associated memory 61 is selected. If the selection signal "s" indicates that the D65 illuminant has been selected, the D65 illuminant-associated memory 62 is selected. Similarly, if the selection signal "s" indicates that the A illuminant has been selected, the A illuminant-associated memory 63 is selected. The neural network management unit 6 delivers the weighting coefficients stored in the selected memory to the neural network 6a. Thereby, the learning of the neural network 6a is performed.

The neural network management unit 6 delivers the colorimetric signal "c" sent from the workstation 32 to the input side of the neural network 6a.

For example, if the A illuminant-associated memory 63 is selected among the provided memories, the neural network 6a receives, after completion of learning, the colorimetric value set with reference to the D50 illuminant and generates an A illuminant-associated color separation value. The neural network management unit 6 delivers via a transmission unit (not shown) the generated color separation value to the color printing device 33 as a color separation value signal "d".

On the basis of the color separation value signal "d" sent from the neural network management unit 6, the color printing device 33 outputs a color image. In this case, a reproduced color appears on a printed matter. If color transformation is performed on the basis of the weighting coefficients stored in the D50 illuminant-associated memory 61, a D50 illuminant-associated color image 33a is output. If color transformation is performed on the basis of the weighting coefficients stored in the D65 illuminant-associated memory 62, a D65 illuminant-associated color image 33b is output. Similarly, if color transformation is performed on the basis of the weighting coefficients stored in the A illuminant-associated memory 63, an A illuminant-associated color image 33n is output.

It should be noted that the neural network management unit 6 can be housed in the body 32a.

Figure 10:
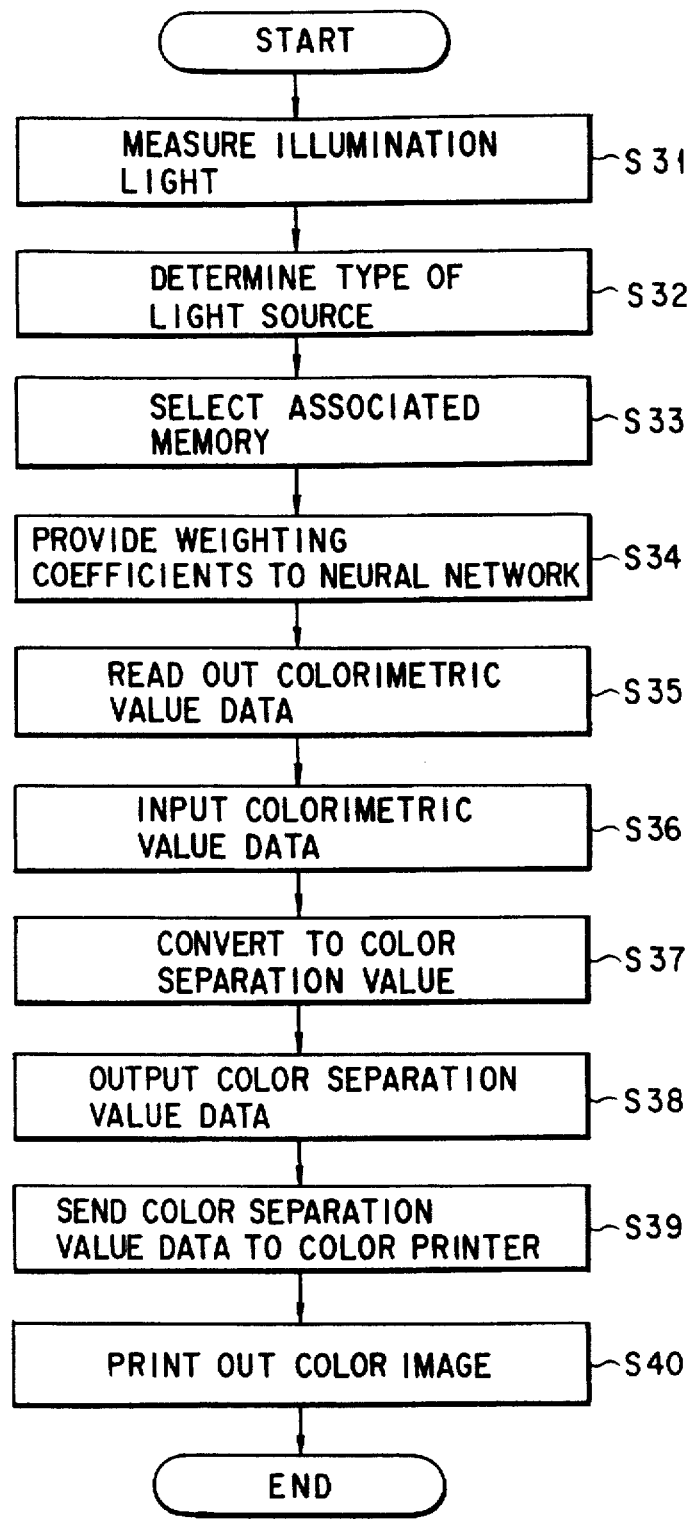
FIG. 10 is a flow chart illustrating an operation of the third embodiment.

The operation of the third embodiment will now be described with reference to the flow chart of FIG. 10.

Illuminant light radiated from an external illuminant is taken into the external photometer 31 and measured (step S31). The measured data is sent to the workstation 32 and the type of the external illuminant is determined (step S32). The memory corresponding to the type of the illuminant is selected (step S33). The weighting coefficients stored in the selected memory are delivered to the neural network 6a (step S34). The colorimetric value data set with reference to the specific illuminant (D50 illuminant) is taken out from the storage unit of the workstation 32 (step S35). The taken-out colorimetric value data is input to the neural network 6a (step S36). The colorimetric value is converted to a color separation value by the neural network 6a (step S37). The color separation value data is output from the neural network 6a (step S38). The generated color separation value data is transmitted to the color printing device 33 (step S39). The color printing device 33 prints out a color image (step S40). Thus, the reproduced color in the case where the above illuminant is used as a reference source for observation is obtained. In this process the external photometer 31 is used. If the user selects and designates the type of the illuminant manually through the workstation, steps S1 and S2 are omitted since there is no need to determine the type of the illuminant.

As has been described above, in the third embodiment, there is no need to provide a plurality of neural networks. Only by providing a single neural network and a necessary number of weighting coefficient memories, desired color transformation can be performed. Accordingly, like the first and second embodiments, even if the illuminant for observation reference is changed, the color matching can be effected so that the color of the printed matter at the time of observation may be unchanged.

A fourth embodiment of the present invention will now be described.

Figure 7:
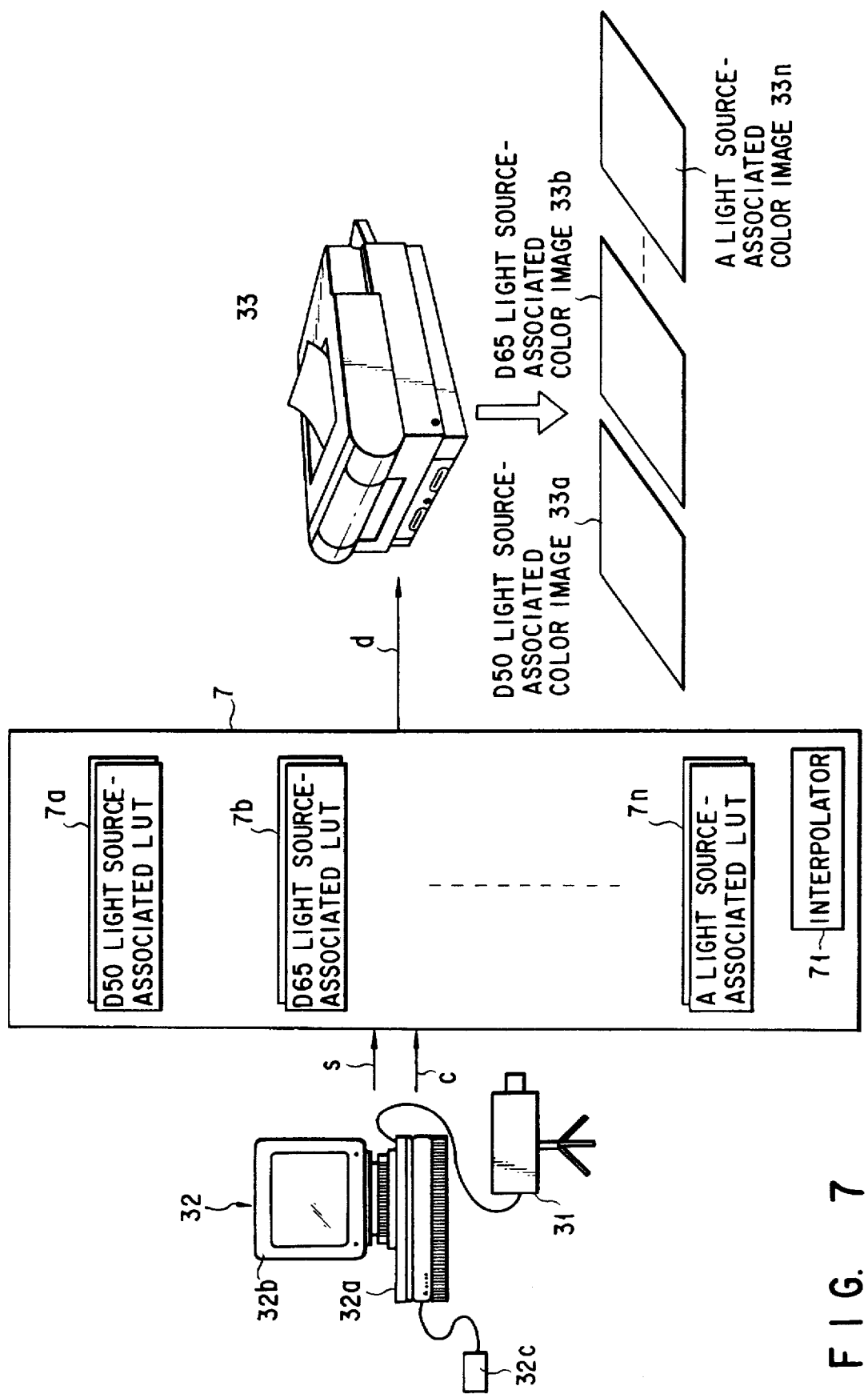
FIG. 7 shows a structure of a reproduced color correction system according to a fourth embodiment of the present invention.

FIG. 7 shows a structure of a system using a look-up table. In FIG. 7, the reproduced color correction system shown in FIG. 3 is modified such that the neural network management unit 3 is replaced by a look-up table management unit (hereinafter referred to as "LUT management unit") which will be described later.

In FIG. 7, the structures and functions of the external photometer 31, workstation 32 and input device 32c are the same as those in the first embodiment. Accordingly, after determining the standard illuminant, the body 32a sends a selection signal "s" representing the type of the determined illuminant to an LUT management unit 7. The storage unit provided within the body 32a stores colorimetric value data preset with reference to the specific standard illuminant. The colorimetric value data is read out from the storage unit and sent to the LUT management unit 7 as a colorimetric value signal "c".

The LUT management unit 7 comprises look-up tables (LUT) 7a, 7b, 7n, etc. corresponding to the D50 illuminant, D65 illuminant, A illuminant, etc., and also comprises an interpolator 71 for calculating an interpolation value on an as-needed basis. Each LUT itself is the same as is used in the above-described conventional color transformation technique. In order to perform interpolation of higher precision, the interpolator 71 adopts a prism interpolation method which is obtained by further developing the above-developed interpolation method. This prism interpolation method is a well-known art.

Figure 8:
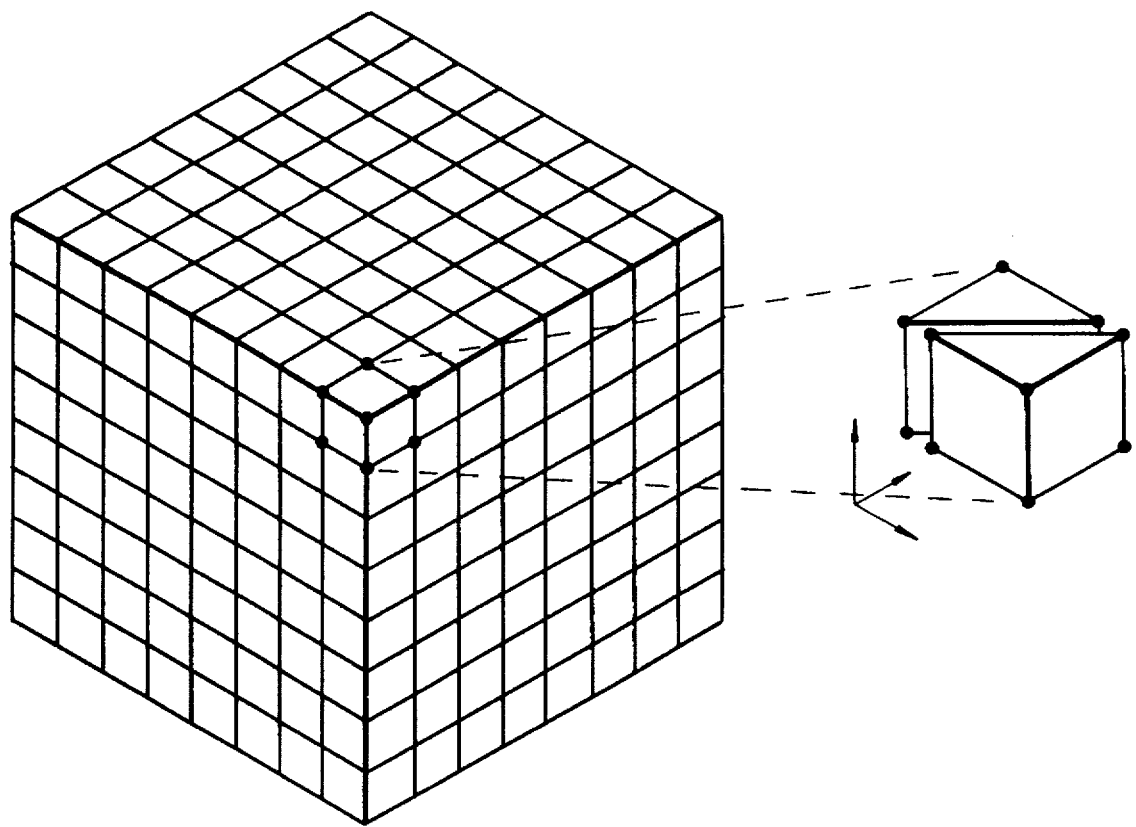
FIG. 8 is a perspective view illustrating a prism interpolation method in the fourth embodiment.

The prism interpolation method will now be described. For example, suppose an input color space of a color system expressed by L*A*B*. A given color in this input color space is converted to a color in another color space. FIG. 8 represents an input color space defined by three axes intersecting one another at right angles. As is shown in FIG. 8, each axis in the input color space is equally divided into eight regions. In this case, the input color space comprises 9×9×9=729 lattice points. There is provided a look-up table for establishing correspondency between input colors and output colors at the respective lattice points. By using the look-up table, an output color is derived from an input color at each lattice point. On the other hand, an output color is generated by interpolation from an input color at a position surrounded by lattice points. At first, one unit cube in the input color space is divided into two parts by a plane parallel to the Y-axis. Thereby, two triangular poles are prepared. Output colors at six points constituting each triangular pole are weighted and added, thereby performing interpolation. On the basis of the output values thus obtained, a desired color separation value is obtained.

The LUT management unit 7 receives the selection signal "s" sent from the workstation 32 and selects the associated LUT. Besides, the LUT management unit 7 receives the colorimetric value signal "c" sent from the workstation 32 and refers to the selected LUT. As a result, if the selection signal "s" indicates the case where the D50 illuminant has been selected, the LUT7a associated with the D50 illuminant is referred to. If the selection signal "s" indicates the case where the D75 illuminant has been selected, the LUT7b associated with the D65 illuminant is referred to. Similarly, if the selection signal "s" indicates the case where the A illuminant has been selected, the LUT7n associated with the A illuminant is referred to. In each LUT at the time it is selected, correspondency between a colorimetric value under a specific illuminant (D50 illuminant in this case) and a color separation value under each illuminant has been established.

The relationship between the colorimetric value and color separation value in this case will now be described with reference to FIG. 4. In the following description, elements 3a, 3b and 3n in FIG. 4 are replaced with 7a, 7b and 7n. The LUT 7a is referred to when a color separation value under the D50 illuminant is derived from a colorimetric value under the specific illuminant (D50 illuminant). The LUT 7b is referred to when a color separation value under the D65 illuminant is derived from a colorimetric value under the specific illuminant (D50 illuminant). Similarly, the LUT 7n is referred to when a color separation value under the A illuminant is derived from a colorimetric value under the specific illuminant (D50 illuminant).

Refer back to FIG. 7. For example, when the LUT 7n associated with the A illuminant has been selected among the provided LUTs, the LUT management unit 7 refers to the LUT 7n and derives the A illuminant-associated color separation value from the colorimetric value set with reference to the D50 illuminant. The LUT management unit 7 sends the generated color separation value via a transmitter (not shown) to the color printing device 33 as a color separation value signal "d".

On the basis of the color separation signal "d" sent from the LUT management unit 7, the color printing device 33 outputs a color image. In this case, a reproduced color appears on a printed matter. If color transformation is performed by the D50 illuminant-associated LUT 7a, a D50 illuminant-associated color image 33a is output. If color transformation is performed by the D65 illuminant-associated LUT 7b, a D65 illuminant-associated color image 33b is output. Similarly, if color transformation is performed by the A illuminant-associated LUT 7n, an A illuminant-associated color image 33n is output.

It should be noted that the LUT management unit 7 can be housed in the body 32a.

Figure 11:
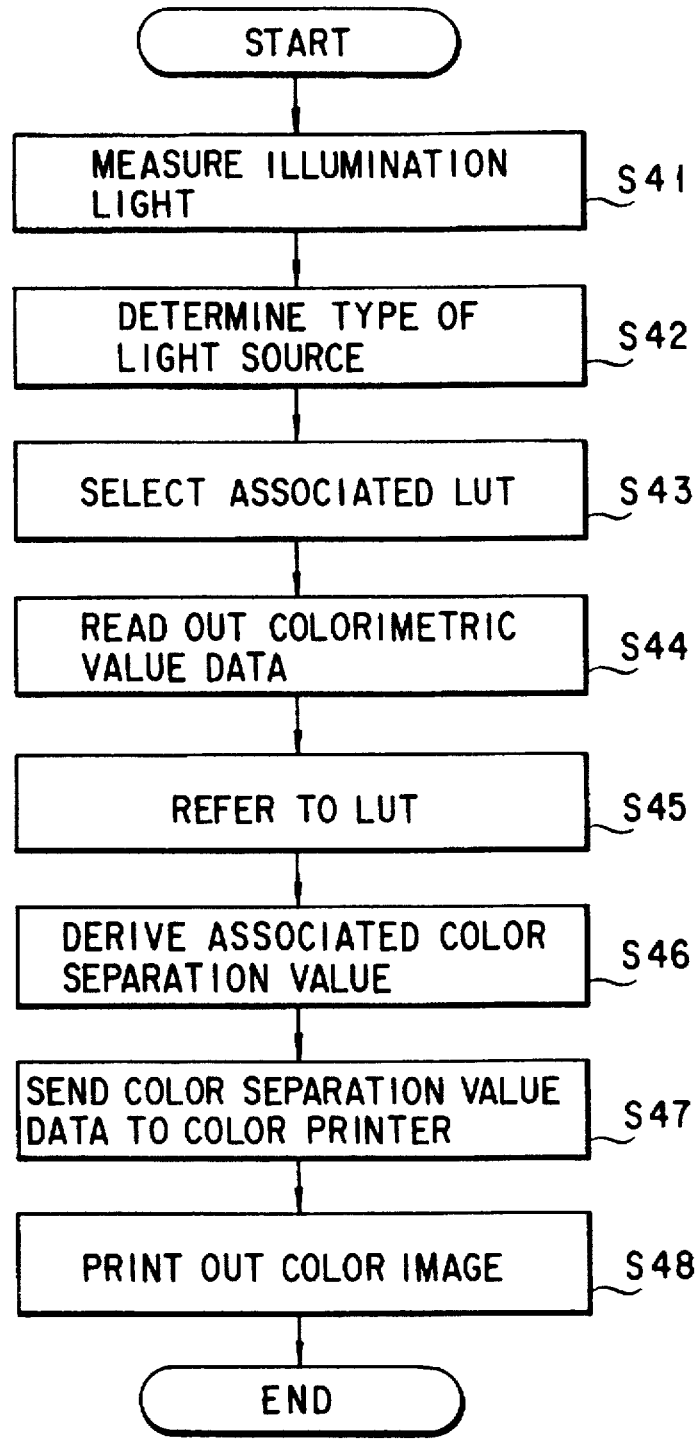
FIG. 11 is a flow chart illustrating an operation of the fourth embodiment.

The operation of the fourth embodiment will now be described with reference to the flow chart of FIG. 11.

Illuminant light radiated from an external illuminant is taken into the external photometer 31 and measured (step S41). The measured data is sent to the workstation 32 and the type of the external illuminant is determined (step S42). The LUT corresponding to the type of the illuminant is selected (step S43). The colorimetric value data set with reference to the specific illuminant (D50 illuminant) is taken out from the storage unit of the workstation 32 (step S44). The selected LUT is referred to (step S45). A color separation value is derived from the colorimetric value by the selected LUT (step S46). An interpolation calculation is performed by the interpolator 61 on an as-needed basis. The obtained generated color separation value data is sent to the color printing device 33 (step S47). The color printing device 33 prints out a color image (step S48). Thus, the reproduced color in the case where the above illuminant is used as a reference source for observation is obtained. In this process the external photometer 31 is used. If the user selects and designates the type of the illuminant manually through the workstation, steps S1 and S2 are omitted since there is no need to determine the type of the illuminant.

As has been described above, in the fourth embodiment, since the LUTs for converting the colorimetric value under the specific illuminant to the color separation values under various illuminants are provided, desired color transformation can be performed by selecting the proper LUT. In this case, the interpolation calculation is performed on an as-needed basis. Accordingly, even if the illuminant for observation reference is changed, the color matching can be effected so that the color of the printed matter at the time of observation may be unchanged.

In the fourth embodiment, as shown in FIG. 4, each LUT receives the colorimetric value under the specific illuminant and derives the color separation value under the associated one of the various illuminants. On the other hand, in FIG. 5, with reference to which the second embodiment was described, the neural networks 3a', 3b' and 3n' may be replaced with LUTs 7a', 7b' and 7n'. Specifically, the D50 illuminant-associated LUT 7a' is referred to in order to derive the D50 illuminant-associated color separation value from the D50 illuminant-associated colorimetric value. The D65 illuminant-associated LUT 7b' is referred to in order to derive the D65 illuminant-associated color separation value from the D65 illuminant-associated colorimetric value. Similarly, the A illuminant-associated LUT 7n' is referred to in order to derive the A illuminant-associated color separation value from the A illuminant-associated colorimetric value. In the case of using the LUTs, like the case of using the neural networks, both modes shown in FIGS. 4 and 5 may be adopted.

In this embodiment, the inventor performed the color transformation by using a Sun Workstation (manufactured by Sun) as workstation 32. In this case, both the neural networks and the look-up tables for obtaining interpolation values were used. In addition, a CLC-500 (manufactured by Canon) was used as color printing device 33 to obtain a color separation value corresponding to the illuminant of a color chart. With the D65 illuminant and A illuminant used for observation reference, images were output. In the D65 illuminant-associated light booth and A illuminant-associated light booth, the inventor compared corresponding printed matters by the naked eye. As a result, it was confirmed that the reproduced colors of the respective printed matters were the same.

As has been described above in detail, according to the present invention, various working modes were adopted as disclosed in the above embodiments. Moreover, in each embodiment, appropriate color transformation can be performed selectively. Thus, even if the viewing condition is changed, exact and easy color matching can be performed with no change in observed colors.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for converting X,Y,Z; L*a*b*; or L*u*v* colorimetric values of an original color image to R,G,B; C,M,Y; or C,M,Y,K, color separation values, the apparatus comprising:

a plurality of converting means for converting the colorimetric values of the original color image which has been obtained under a specific illuminant to the color separation values under a plurality of observation illuminants differing in types;

means for selecting one of said plurality of converting means; and means for outputting the color image based on the color separation value obtained by said converting means selected by said selecting means, each of said plurality of converting means converting colorimetric values such that observed colors of the color image output by said outputting means under the corresponding illuminant match with colors of the original color image.

2. The apparatus according to claim 1, wherein said selecting means comprises input means operated by an operator.

3. The apparatus according to claim 1, wherein said selecting means comprises photometer means for determining the types of the illuminants and means for selecting one of said plurality of converting means based on a determination result by said photometer means.

4. The apparatus according to claim 1, wherein each of said plurality of converting means comprises a multilayered feed-forward type neural network.

5. The apparatus according to claim 1, wherein each of said plurality of converting means comprises a look-up table.

6. The apparatus according to claim 1, wherein said plurality of converting means comprises means for converting at least one of colorimetric values under a D illuminant with color temperatures of 4000 to 20000[k], fluorescent lamp illuminants of standards F1 to F12, an A illuminant, a B illuminant, and a C illuminant.

7. An apparatus for converting X,Y,Z; L*a*b*; or L*u*v* colorimetric values of an original color image to R,G,B; C,M,Y; or C,M,Y,K, color separation values, the apparatus comprising:

a plurality of converting means for converting the colorimetric values of the original color image which has been obtained under a plurality of illuminants to the color separation values under a plurality of observation illuminants differing in types;

means for selecting one of said plurality of converting means; and means for outputting the color image based on the color separation value obtained by said converting means selected by said selecting means, each of said plurality of converting means converting colorimetric values such that observed colors of the color image output by said outputting means under the corresponding illuminant match with colors of the corresponding original color image.

8. The apparatus according to claim 7, wherein said selecting means comprises input means operated by an operator.

9. The apparatus according to claim 7, wherein said selecting means comprises photometer means for determining the types of the illuminants and means for selecting one of said plurality of converting means based on a determination result by said photometer means.

10. The apparatus according to claim 7, wherein each of said plurality of converting means comprises a multilayered feed-forward type neural network.

11. The apparatus according to claim 7, wherein each of said plurality of converting means comprises a look-up table.

12. The apparatus according to claim 7, wherein said plurality of converting means comprises means for converting at least one of colorimetric values under a D illuminant with color temperatures of 4000 to 20000[k], fluorescent lamp illuminants of standards F1 to F12, an A illuminant, a B illuminant, and a C illuminant.

13. An apparatus for converting X,Y,Z; L*a*b*; or L*u*v* colorimetric values of an original color image to R,G,B; C,M,Y; or C,M,Y,K, color separation values, the apparatus comprising:

a neutral network for converting the colorimetric values to the color separation values, the neural network having neurons connected to each other via given weights;

means for storing plural sets of weights which make said neural network convert the colorimetric values of the original color image which has been obtained under a specific illuminant to plural color separation values under plural observation illuminants differing in types;

means for selectively supplying one of the sets of weights stored in said storing means to said neural network in accordance with an observation illuminant; and means for outputting the color image based on the color separation value obtained by said neural network supplied with the set of weights selected by said selecting means, each of said plural sets of weights making the neural network convert colorimetric values such that observed colors of the color image output by said outputting means under the corresponding illuminant match with colors of the original color image.

14. An apparatus for converting x,Y,Z; L*a*b*; or L*u*v* colorimetric values of an original color image to R,G,B; C,M,Y; or C,M,Y,K, color separation values, the apparatus comprising:

a neural network for converting the colorimetric values to the color separation values, the neural network having neurons connected to each other via given weights;

means for storing plural sets of weights which make said neural network convert the colorimetric values of the original color image which has been obtained under plural illuminants to plural color separation values under plural observation illuminants differing in types;

means for selectively supplying one of the sets of weights stored in said storing means to said neural network in accordance with an observation illuminant; and means for outputting the color image based on the color separation value obtained by said neural network supplied with the set of weights selected by said selecting means, each of said plural sets of weights causing said neural network to convert colorimetric values such that observed colors of the color image output by said outputting means under the corresponding illuminant match with colors of the corresponding original color image.

* * * * *